(12) United States Patent
Hiraiwa et al.

(10) Patent No.: US 11,433,808 B2
(45) Date of Patent: Sep. 6, 2022

(54) VEHICLE INFORMATION PROVISION DEVICE

(71) Applicant: Toyota Jidosha Kabushiki Kaisha, Toyota (JP)

(72) Inventors: Hiroshi Hiraiwa, Toyota (JP); Michio Ikeda, Nagoya (JP); Kazuhiro Matsui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 401 days.

(21) Appl. No.: 16/674,661

(22) Filed: Nov. 5, 2019

(65) Prior Publication Data

US 2020/0148105 A1 May 14, 2020

(30) Foreign Application Priority Data

Nov. 8, 2018 (JP) .............................. JP2018-210290

(51) Int. Cl.
| | |
|---|---|
| *B60Q 9/00* | (2006.01) |
| *B60W 40/08* | (2012.01) |
| *G05D 1/02* | (2020.01) |
| *G06T 11/00* | (2006.01) |
| *G06V 20/59* | (2022.01) |
| *G05D 1/00* | (2006.01) |
| *G06V 10/25* | (2022.01) |
| *G06V 20/58* | (2022.01) |

(52) U.S. Cl.
CPC ............... *B60Q 9/00* (2013.01); *B60W 40/08* (2013.01); *G05D 1/021* (2013.01); *G06T 11/00* (2013.01);

(Continued)

(58) Field of Classification Search
CPC ......... B60Q 9/00; B60Q 9/008; B60W 40/08; B60W 2040/0818; B60W 2540/01; B60W 2540/225; B60W 2540/229; B60W 2554/4029; B60W 30/0956; B60W 50/14; G05D 1/021; G05D 1/0088;
(Continued)

(56) References Cited

U.S. PATENT DOCUMENTS 10,449,898 B2 * 10/2019 Sherony ............. G08G 1/09626
11,142,192 B2 * 10/2021 Hayamizu ................ G08G 1/16
(Continued)

FOREIGN PATENT DOCUMENTS

| JP | 2002-224092 A | 8/2002 |
|---|---|---|
| JP | 2005-199992 A | 7/2005 |

(Continued)

*Primary Examiner* — Frederick M Brushaber
(74) *Attorney, Agent, or Firm* — Dinsmore & Shohl LLP

(57) ABSTRACT

A vehicle information provision device includes a travel state detection unit, a surroundings situation detection unit, a potential hazard detection unit detecting a potential hazard based on the situation detected by the surroundings situation detection unit, a driver state detection unit detecting the driver state during self-driving of a vehicle; a driver state determination unit configured to determine whether or not the driver is observing the situation in the vehicle surroundings based on the state of the driver detected by the driver state detection unit, and an information control unit that provides information to the driver regarding the potential hazard in a case in which the driver is observing the situation in the vehicle surroundings, and restricts provision of information to the driver in a case in which the driver is not observing the situation in the vehicle surroundings during self-driving of the vehicle.

8 Claims, 10 Drawing Sheets

(52) U.S. Cl.
CPC ... *G06V 20/597* (2022.01); *B60W 2040/0818* (2013.01); *G05D 1/0088* (2013.01); *G05D 2201/0213* (2013.01)

(58) Field of Classification Search
CPC ............ G05D 2201/0213; G06T 11/00; G06V 20/597; G06V 10/25; G06V 20/58; B60K 2370/149; B60K 2370/176; B60K 2370/178; B60K 2370/179; B60K 2370/193; B60K 2370/195; B60K 35/00; B60R 1/00; B60R 2300/20; B60R 2300/301
See application file for complete search history.

(56) References Cited

U.S. PATENT DOCUMENTS

| | | | | |
|---|---|---|---|---|
| 2006/0235615 | A1* | 10/2006 | Kato | G05D 1/0278 701/1 |
| 2010/0036578 | A1* | 2/2010 | Taguchi | B60W 40/04 701/93 |
| 2013/0342330 | A1* | 12/2013 | Kiefer | B60N 2/90 340/407.1 |
| 2013/0342339 | A1* | 12/2013 | Kiefer | G08B 6/00 340/438 |
| 2013/0342366 | A1* | 12/2013 | Kiefer | B60N 2/986 340/407.1 |
| 2015/0062141 | A1 | 3/2015 | Hayasaka | |
| 2015/0097866 | A1 | 4/2015 | Mochizuki et al. | |
| 2017/0323164 | A1* | 11/2017 | Kishi | G06T 11/60 |
| 2019/0111945 | A1* | 4/2019 | Wiegand | B60W 50/14 |
| 2019/0202451 | A1* | 7/2019 | Hayamizu | B60W 30/09 |

FOREIGN PATENT DOCUMENTS

| | | |
|---|---|---|
| JP | 2006-318446 A | 11/2006 |
| JP | 2008-123197 A | 5/2008 |
| JP | 2012-037924 A | 2/2012 |
| JP | 2015-049842 A | 3/2015 |
| JP | 2015-092237 A | 5/2015 |
| JP | 2018-077105 A | 5/2018 |
| JP | 2018-101321 A | 6/2018 |

* cited by examiner

FIG.7

VEHICLE INFORMATION PROVISION DEVICE

CROSS-REFERENCE TO RELATED APPLICATION

This application claims priority under 35 USC 119 from Japanese Patent Application No. 2018-210290 filed Nov. 8, 2018, the disclosure of which is incorporated by reference herein in its entirety.

BACKGROUND

Technical Field

The present disclosure relates to a vehicle information provision device.

Related Art

Japanese Patent Application Laid-Open (JP-A) No. 2012-37924 discloses an invention relating to a driving assist device. In this driving assist device, when an image captured by an onboard camera is displayed on a display device inside a vehicle cabin, in a case in which an obstacle detected by an obstacle detection device is included in the image, a superimposed indicator that moves dynamically from the vehicle to the obstacle is displayed.

The driver is thus able to easily and intuitively recognize a sense of a distance from the vehicle to the obstacle and a sense of depth perception regarding the obstacle when looking at the image on the display device.

SUMMARY

In vehicles that are capable of switching between being driven by a driver and self-driving, the driver who is freed up from driving operations during self-driving is able to pass the time freely inside the vehicle cabin. However, in a case in which images regarding the situation in the vehicle surroundings are displayed on a display device, or in a case in which the driver is able to observe objects requiring caution such as other vehicles or pedestrians present in the vehicle surroundings (hereafter referred to as "potential hazards") through front windshield glass (hereafter referred to as the "windshield") during self-driving, the driver may be distracted and annoyed by the potential hazards. Thus, the above related art leaves room for improvement regarding this point.

In consideration of the above circumstances, the present disclosure obtains a vehicle information provision device capable of improving the comfort of a driver during self-driving.

A vehicle information provision device of a first aspect of the present disclosure includes a travel state detection unit configured to detect a travel state of a vehicle, which is capable of self-driving, a surroundings situation detection unit configured to detect a situation in surroundings of the vehicle, a potential hazard detection unit configured to detect a potential hazard based on the situation in the vehicle surroundings detected by the surroundings situation detection unit, a driver state detection unit configured to detect a state of a driver during self-driving of the vehicle, a driver state determination unit configured to determine whether or not the driver is observing the situation in the vehicle surroundings based on the state of the driver detected by the driver state detection unit, and an information control unit that, when self-driving of the vehicle is detected by the travel state detection unit, provides information to the driver regarding the potential hazard detected by the potential hazard detection unit in a case in which the driver is observing the situation in the vehicle surroundings, and restricts provision of information to the driver regarding the potential hazard detected by the potential hazard detection unit in a case in which the driver is not observing the situation in the vehicle surroundings during self-driving of the vehicle.

According to the vehicle information provision device of the first aspect, the vehicle information provision device includes the travel state detection unit, the surroundings situation detection unit, the potential hazard detection unit, the driver state detection unit, the driver state determination unit, and the information control unit. The potential hazard detection unit detects potential hazards in the situation in the vehicle surroundings detected by the surroundings situation detection unit. The driver state determination unit determines whether or not the driver is observing the situation in the vehicle surroundings based on the driver state detected by the driver state detection unit during self-driving of the vehicle. When self-driving of the vehicle is detected by the travel state detection unit, the information control unit provides information to the driver regarding the potential hazard in a case in which the driver is observing the situation in the vehicle surroundings. On the other hand, the information control unit restricts provision of information to the driver regarding the potential hazard in a case in which the driver is not observing the situation in the vehicle surroundings. The driver is therefore less likely to notice potential hazards when the driver is freed up from driving during self-driving of the vehicle and is not observing the situation in the vehicle surroundings. This enables the driver to be suppressed from being distracted by potential hazards.

A vehicle information provision device of a second aspect of the present disclosure is the first aspect, wherein the information control unit displays a masking image that masks the potential hazard on a display device, in a case in which the driver is not observing the situation in the vehicle surroundings during self-driving of the vehicle.

According to the vehicle information provision device of the second aspect, the information control unit displays the masking image that masks the potential hazard in a case in which the driver is not observing the situation in the vehicle surroundings during self-driving of the vehicle, allowing the driver to recognize circumstances other than potential hazards. Namely, the driver is able to observe the scenery. The driver is also able to ascertain the brightness and so on outside the vehicle, enabling the driver to ascertain the approximate time of day.

A vehicle information provision device of a third aspect of the present disclosure is the first aspect, wherein the information control unit displays a masking image that masks an entire range at a vehicle lower side with respect to an eye height of the driver on a display device in a case in which the driver is not observing the situation in the vehicle surroundings during self-driving of the vehicle.

According to the vehicle information provision device of the third aspect, the information control unit displays the masking image that masks the entire range at the vehicle lower side with respect to the eye height of the driver on the display device, in a case in which the driver is not observing the situation in the vehicle surroundings during self-driving of the vehicle. Thus, since the range at the vehicle lower side with respect to the eye height of the driver on the display device is masked in a case in which observation of the scenery is not required, such as when traveling through a location that is passed regularly, the driver is allowed to relax and spend their time freely inside the vehicle as if they were at home, without being distracted by the situation in the surroundings of the vehicle. Moreover, display is not masked outside of the range on the display device, enabling the driver to ascertain the approximate time of day based on factors such as the brightness outside the vehicle.

A vehicle information provision device of a fourth aspect of the present disclosure is the second aspect or the third aspect, wherein the information control unit modifies a tint of the masking image according to the travel state detected by the travel state detection unit.

According to the vehicle information provision device of the fourth aspect, the information control unit modifies the tint of the masking image according to the travel state of the vehicle detected by the travel state detection unit. As an example, in a case in which a potential hazard that might affect the behavior of the vehicle is present in the surroundings of the vehicle and the travel state may change, the tint of the masking image is made paler such that the driver is able to ascertain the potential hazard, thereby enabling the driver to feel reassured in a case in which the vehicle has changed its behavior.

A vehicle information provision device of a fifth aspect of the present disclosure is any one of the second aspect to the fourth aspect, wherein the information control unit displays simplified information corresponding to the potential hazard either superimposed on or close to the masking image, in a case in which the driver is not observing the situation in the vehicle surroundings during self-driving of the vehicle.

According to the vehicle information provision device of the fifth aspect, the information control unit displays the simplified information corresponding to the potential hazard either superimposed on the masking image or close to the masking image in a case in which the driver is not observing the situation in the vehicle surroundings during self-driving of the vehicle. This enables the driver to ascertain that the potential hazards are present in the surroundings of the vehicle, without being overly distracted by the potential hazards.

A vehicle information provision device of the sixth aspect of the present disclosure is any one of the first aspect to the fifth aspect, wherein the driver state detection unit detects a state of a passenger other than the driver, the driver state determination unit determines whether or not the passenger is observing the situation in the vehicle surroundings based on the state of the passenger detected by the driver state detection unit, and the information control unit restricts provision of information to the passenger regarding the potential hazard, in a case in which the passenger is not observing the situation in the vehicle surroundings during self-driving of the vehicle, based on a determination result of the driver state determination unit.

According to the vehicle information provision device of the sixth aspect, the driver state determination unit determines whether or not the passenger other than the driver (referred to hereafter simply as the "passenger") is observing the situation in the vehicle surroundings based on a detection result of the driver state detection unit that detects the state of the passenger. The information control unit restricts provision of information to the passenger regarding the potential hazard, in a case in which the passenger is not observing the situation in the vehicle surroundings during self-driving of the vehicle based on the determination result of the driver state determination unit. Thus, not only the driver, but also the passenger, can be suppressed from being distracted by potential hazards during self-driving of the vehicle.

The vehicle information provision device of the first aspect exhibits the excellent advantageous effect of enabling the comfort of the driver to be improved during self-driving.

The vehicle information provision device of the second aspect to the fifth aspect exhibits the excellent advantageous effect of enabling the comfort of the driver to be further improved during self-driving.

The vehicle information provision device of the sixth aspect exhibits the excellent advantageous effect of enabling the comfort of the passenger other than the driver to be improved during self-driving.

BRIEF DESCRIPTION OF THE DRAWINGS

Exemplary embodiments of the present disclosure will be described in detail based on the following figures, wherein:

FIG. 7 is a schematic view illustrating a state in which a vehicle information provision device according to a second exemplary embodiment is restricting provision of information regarding potential hazards;

DETAILED DESCRIPTION

First Exemplary Embodiment

Figure 1:
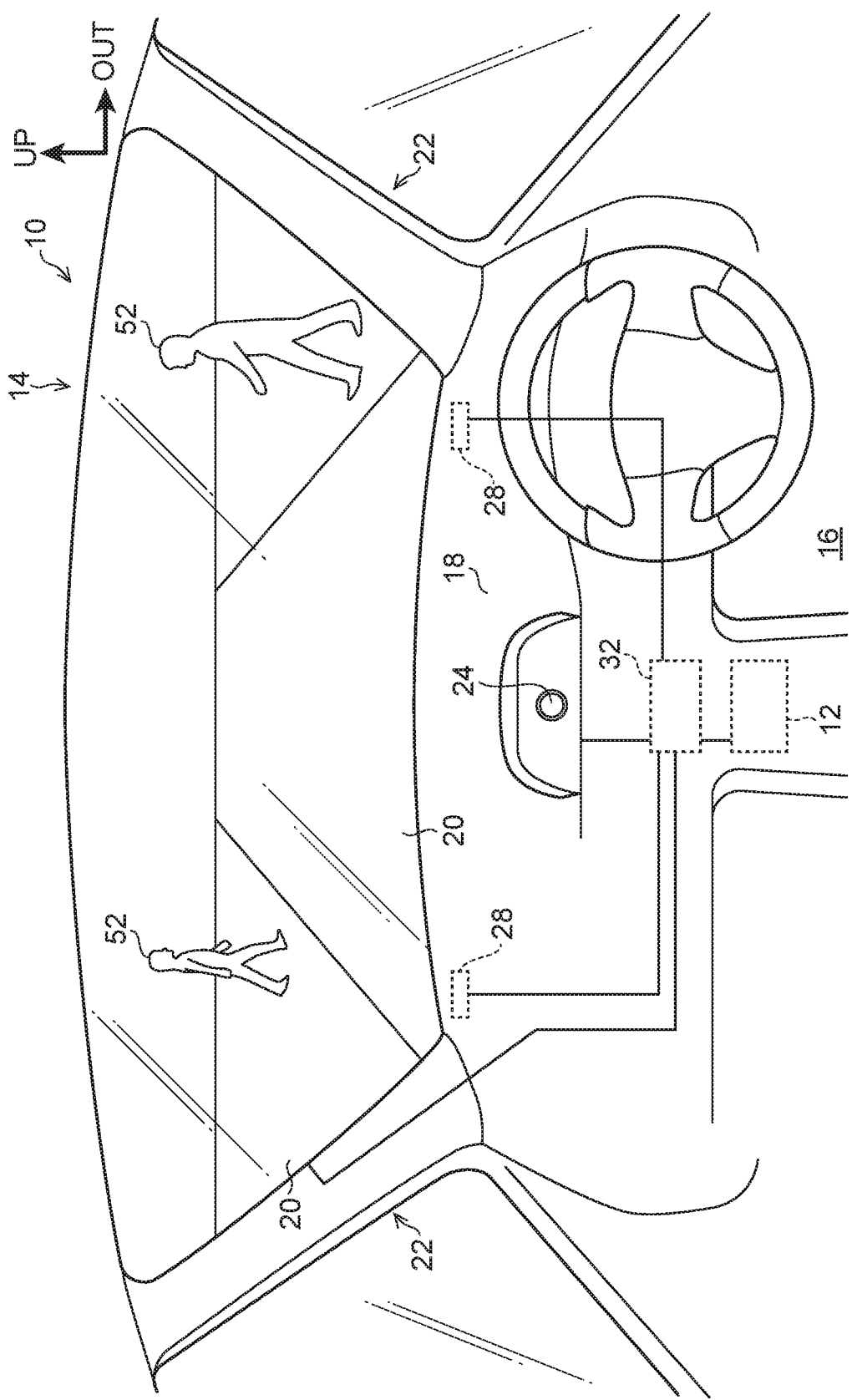
FIG. 1 is a schematic view illustrating an example of a travel state of a vehicle including a vehicle information provision device according to a first exemplary embodiment, in a state viewed from inside a vehicle cabin toward a front side of the vehicle.

Explanation follows regarding a first exemplary embodiment of a vehicle information provision device of the present disclosure, with reference to FIG. 1 to FIG. 6. Note that in the drawings, configuration elements and parts that are the same as or equivalent to each other are appended with the same reference numerals. Moreover, proportions in the drawings may be exaggerated to aid explanation and thus may differ from the true proportions.

Overall Configuration

As illustrated in FIG. 1, a vehicle information provision device 10 is installed to a vehicle 14 that is capable of being self-driven by a self-driving control device 12. An instrument panel 18 is provided at the vehicle front side at an inside of a vehicle cabin 16. Specifically, the instrument panel 18 is disposed at an upper section on a vehicle rear side of a dash panel (not illustrated in the drawings) that partitions between the vehicle cabin 16 and a vehicle front section. A lower end portion of the dash panel is joined to a front end portion of a non-illustrated floor panel, and the floor panel configures a lower surface of the vehicle cabin 16. A non-illustrated cowl is joined to an upper end portion of the dash panel, and the cowl supports a lower end portion of a windshield 20, serving as a display device. The windshield 20 configures a front surface of an upper portion of the vehicle cabin 16. The lower end portion of the windshield 20 is disposed at an upper end portion of the instrument panel 18.

Non-illustrated front seats, serving as vehicle front seats, are provided at the vehicle rear side of the instrument panel 18. In the present exemplary embodiment, the front seats are configured by a front passenger seat on the left side and a driver seat on the right side of the front section of the vehicle cabin 16.

The instrument panel 18 is configured as an interior panel member extending along the vehicle width direction. Instrument panel reinforcement (not illustrated in the drawings) with an elongated shape running along the vehicle width direction is installed at an upper portion at the interior of the instrument panel 18. The instrument panel 18 is attached to the instrument panel reinforcement at plural locations. Note that the instrument panel reinforcement is a metal pipe member, and both length direction end portions of the instrument panel reinforcement are fixed to vehicle lower sides of a pair of front pillars 22 that project upright at left and right side sections of a vehicle body.

A driver monitoring camera 24 is provided at a vehicle width direction substantially central portion of an upper face of the instrument panel 18. An imaging optical axis (lens) of the driver monitoring camera 24 is directed toward the rear of the vehicle so as to image the faces of a non-illustrated driver and a passenger, seated in the front seats. Specific configuration and operation of the driver monitoring camera 24 is described later.

In order for the vehicle 14 to travel automatically, the self-driving control device 12 determines the situation in the vehicle 14 and its surroundings based on route information from a map information storage section that stores information obtained from a navigation system (neither of which are illustrated in the drawings), and information obtained from various sensors including surroundings detection sensors 28, described later. Then, the self-driving control device 12 performs automatic driving control in which acceleration amounts, braking amounts, steering amounts, and the like are controlled until a destination is reached. Note that control by the self-driving control device 12 during self-driving is known from JP-A No. 2008-123197 and the like, and so detailed explanation is omitted.

Hardware Configuration

Figure 3:
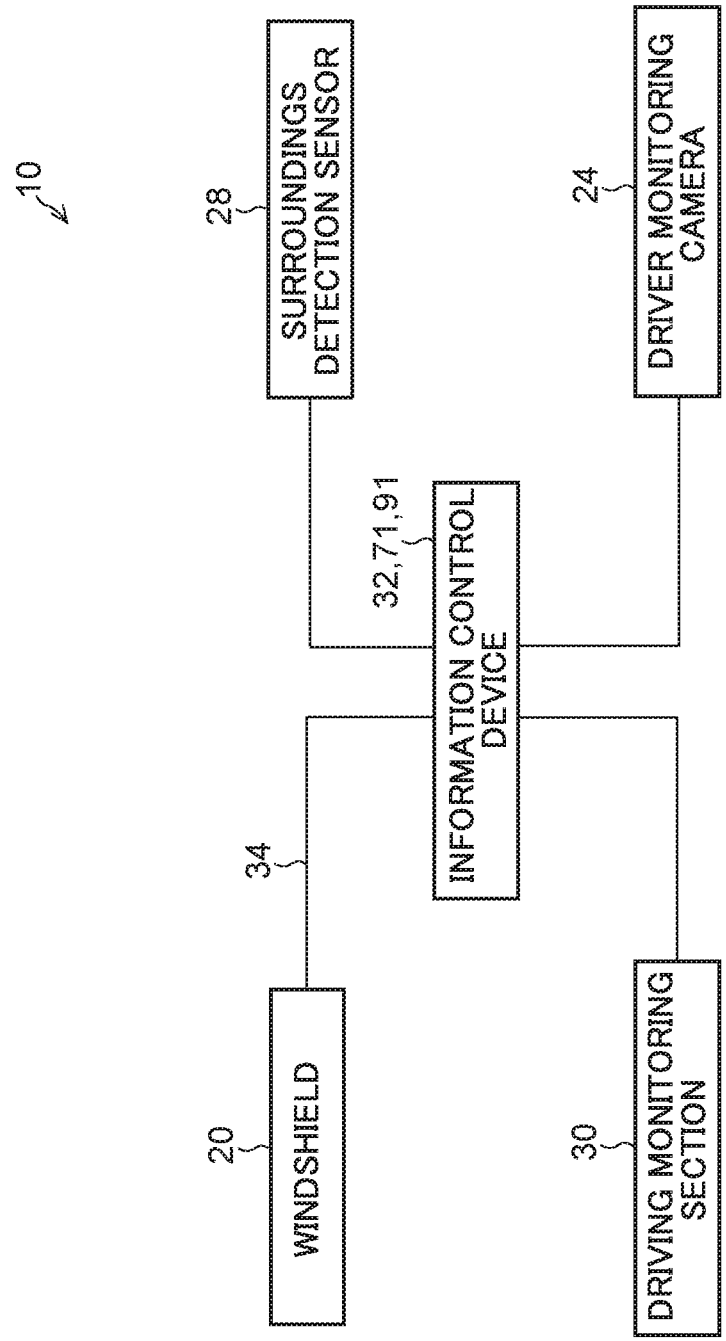
FIG. 3 is a block diagram illustrating hardware configuration of a vehicle information provision device according to the first exemplary embodiment.

FIG. 3 is a block diagram illustrating hardware configuration of the vehicle information provision device 10.

As illustrated in FIG. 3, the vehicle information provision device 10 includes a driving monitoring section 30 serving as a travel state detection unit, the surroundings detection sensors 28 serving as a surroundings situation detection unit, the driver monitoring camera 24 serving as a driver state detection unit, the windshield 20, and an information control device 32 serving as a potential hazard detection unit, a driver state determination unit and an information control unit. Each of these configurations are connected together so as to be capable of mutual communication through a bus 34.

The driving monitoring section 30 monitors an activation state of the self-driving control device 12 (see FIG. 1). The driving monitoring section 30 thereby detects and outputs whether or not the vehicle 14 is being self-driven.

The surroundings detection sensors 28 are sensors for detecting the situation in the surroundings of the vehicle 14. The surroundings detection sensors 28 are configured including laser radar, ultrasound sensors, millimeter-wave radar (none of which are illustrated in the drawings), or the like, and may be configured by a combination of plural sensors.

The driver monitoring camera 24 mainly images both eyes of the respective faces of the driver and the passenger, and outputs the result thereof.

Figure 2:
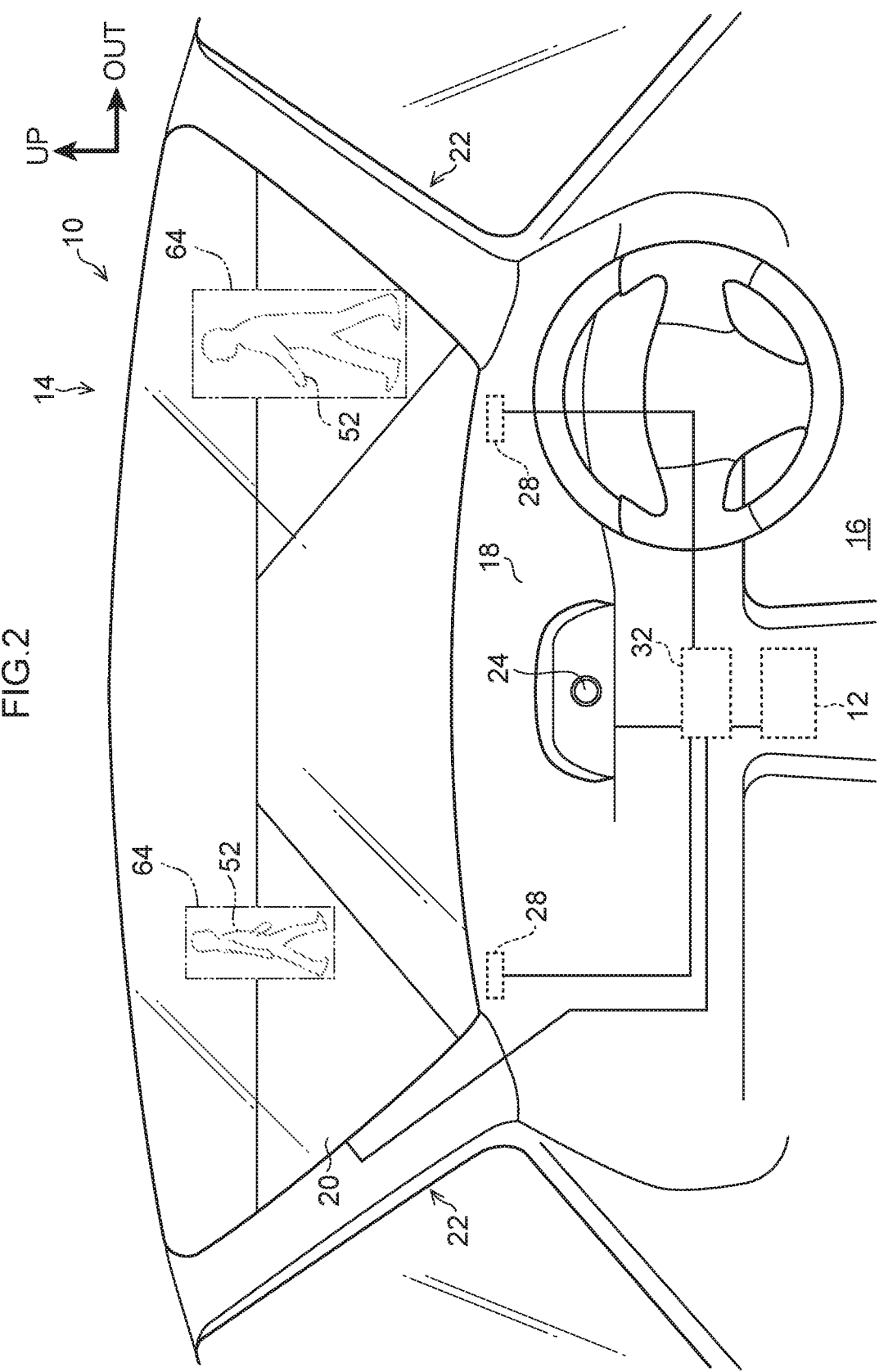
FIG. 2 is a schematic view illustrating an example of a state in which a vehicle information provision device according to the first exemplary embodiment is restricting provision of information regarding potential hazards.

As an example, a non-illustrated see-through display unit is provided over the entire surface of the windshield 20, such that desired information, images, and the like can be displayed at desired positions on the windshield 20 (see FIG. 2).

Figure 4:
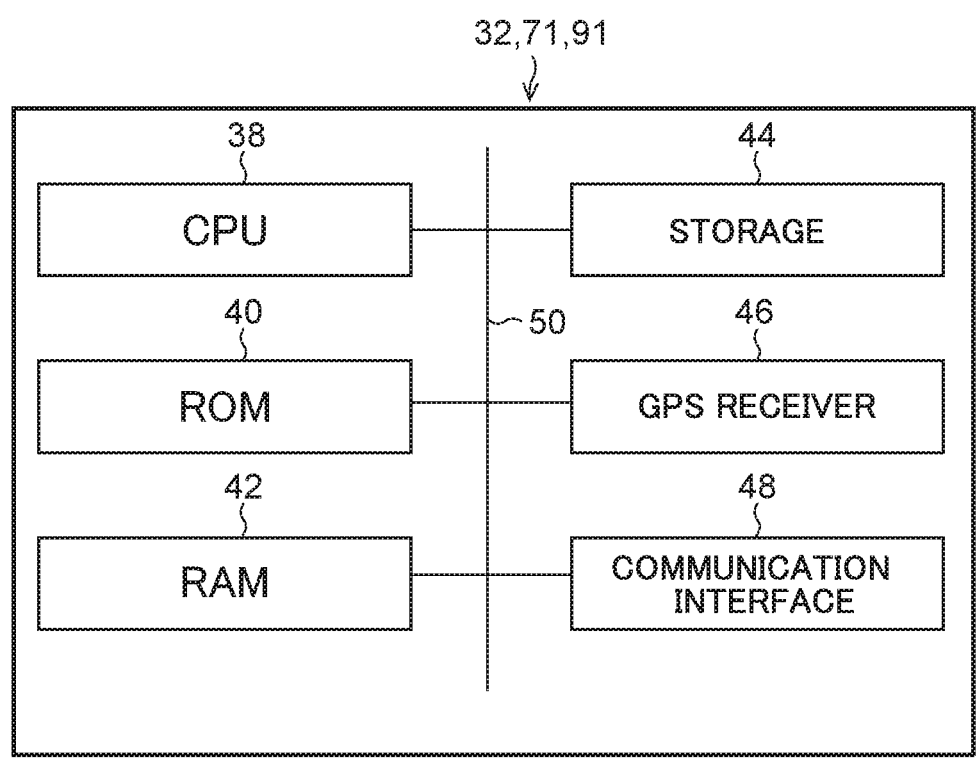
FIG. 4 is a block diagram illustrating hardware configuration of an information control unit according to the first exemplary embodiment.

As illustrated in FIG. 4, the information control device 32 is configured with internal components including a Central Processing Unit (CPU) 38, Read Only Memory (ROM) 40, Random Access Memory (RAM) 42, storage 44, a GPS receiver 46, and a communication interface 48. Each of these configuration elements are connected together so as to be capable of mutual communication through a bus 50.

The CPU 38 is a central computation processing unit that executes various programs and controls various sections. Namely, the CPU 38 reads a program from the ROM 40 or the storage 44, and executes the program using the RAM 42 as a workspace. The CPU 38 controls the above configuration elements and performs various computation processing according to the program recorded in the ROM 40 or the storage 44. In the present exemplary embodiment, a potential hazard detection program, a driver state determination program, and a display control program are held in the ROM 40 or the storage 44. The potential hazard detection program detects potential hazards 52 (see FIG. 1) based on the situation in the surroundings of the vehicle 14 detected by the surroundings detection sensors 28. The driver state determination program determines the states of the driver and the passenger based on images captured by the driver monitoring camera 24. The display control program performs processing for information display on the windshield 20.

The GPS receiver 46 receives signals based on a GPS method from plural satellites and identifies the position of the vehicle 14 (the vehicle information provision device 10) based on the different arrival times of the signals.

The communication interface 48 is an interface for communicating with non-illustrated servers of external devices, and for example employs Ethernet (registered trademark), FDDI, Wi-Fi (registered trademark), or another protocol.

Functional Configuration

When executing the display control program, the vehicle information provision device 10 employs the above hardware resources to implement various functions. Explanation follows regarding functional configuration implemented by the vehicle information provision device 10.

Figure 5:
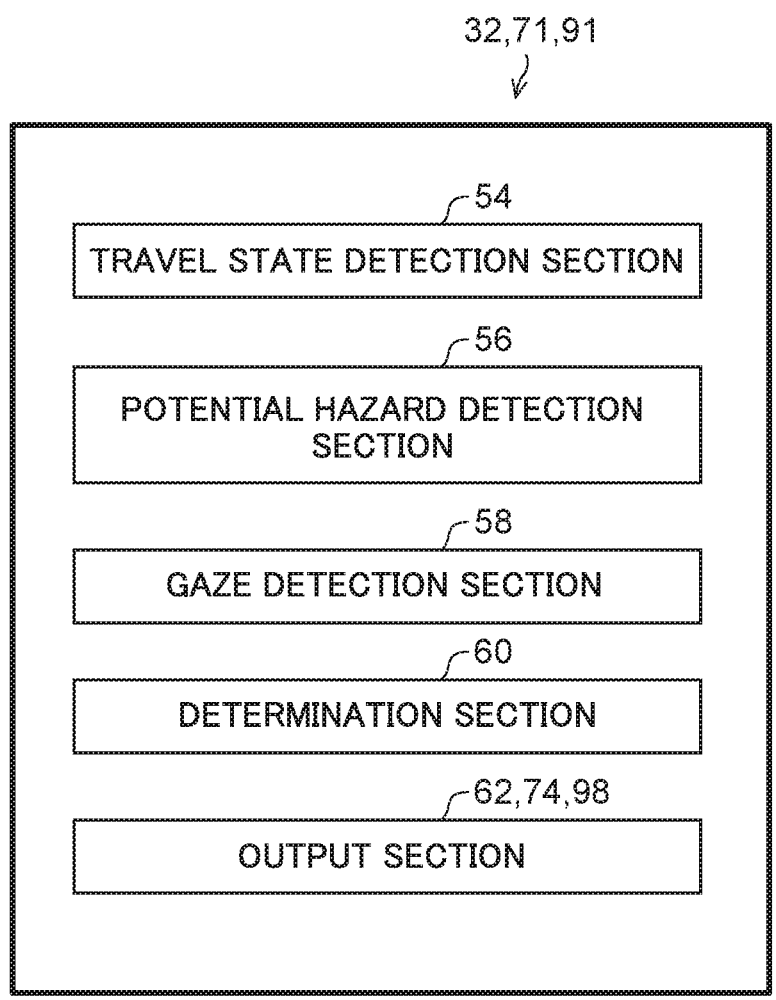
FIG. 5 is a block diagram illustrating functional configuration of a vehicle information provision device according to the first exemplary embodiment.

FIG. 5 is a block diagram illustrating an example of functional configuration of the information control device 32.

As illustrated in FIG. 5, as functional configuration, the information control device 32 includes a travel state detection section 54, a potential hazard detection section 56, a gaze detection section 58, and a determination section 60 and an output section 62. The travel state detection section 54 serves as a travel state detection unit, the potential hazard detection section 56 serves as a potential hazard detection unit, the gaze detection section 58 serves as a driver state determination unit, and the determination section 60 and the output section 62 serve as an information control unit. Each functional configuration is implemented by the CPU 38 of the information control device 32 reading and executing the display control program stored in the ROM 40 or the storage 44 (see FIG. 4).

The travel state detection section 54 receives information regarding the activation state of the self-driving control device 12 from the driving monitoring section 30, and determines whether or not the vehicle 14 is being self-driven.

The potential hazard detection section 56 receives information regarding the situation in the vehicle surroundings from the surroundings detection sensors 28, and identifies the presence, type, position, and so on of potential hazards 52 (see FIG. 1).

The gaze detection section 58 receives an image captured by the driver monitoring camera 24, and determines whether or not the gazes of the driver and the passenger are directed through the windshield 20 toward the front side of the vehicle or the like, namely, whether or not the driver and the passenger are observing the situation in the vehicle surroundings.

The determination section 60 decides whether or not to restrict provision of information regarding potential hazards 52 based on the travel state of the vehicle 14, the states of the driver and the passenger, the presence of potential hazards 52, and so on.

In a case in which the determination section 60 has decided to "restrict provision of information regarding potential hazards 52" (hereafter referred to as "restricted display"), as illustrated in FIG. 2, the output section 62 displays masking images 64 overlaid on the potential hazards 52 along the gazes of the driver and the passenger when looking toward the front side of the vehicle. As an example, each of the masking images 64 covers the entirety of the corresponding potential hazard 52, and is formed in a rectangular shape filled in with colors approximated to the scenery in the surroundings of the potential hazard 52. The potential hazards 52 are thereby masked such that the potential hazards 52 cannot be readily seen by the driver and the passenger. Note that although each of the masking images 64 is illustrated with an outline in FIG. 2 in order to facilitate understanding, this outline does not have to be present.

Processing Flow

Figure 6:
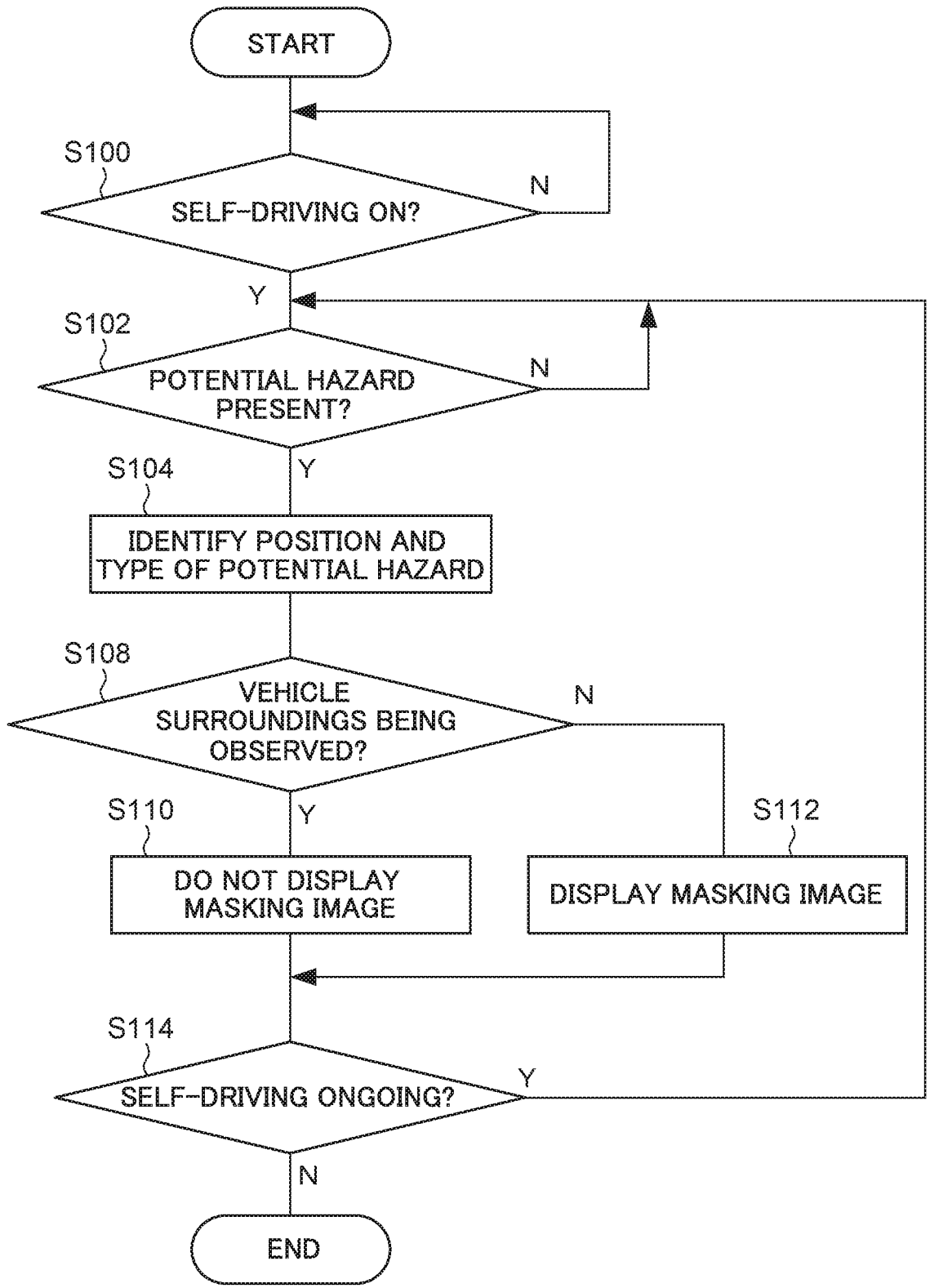
FIG. 6 is a flowchart illustrating a flow of operation by a vehicle information provision device according to the first exemplary embodiment.

Explanation follows regarding operation of the vehicle information provision device 10. FIG. 6 is a flowchart illustrating a flow of operation by the vehicle information provision device 10. The display processing is performed by the CPU 38 reading the display control program from the ROM 40 or the storage 44, and expanding and executing the program in the RAM 42.

The CPU 38 determines whether or not the vehicle 14 is being self-driven (step S100). In a case in which the vehicle 14 is not being self-driven (step S100: NO), the CPU 38 repeats the processing of step S100.

In a case in which the vehicle 14 is being self-driven (step S100: YES), the CPU 38 determines whether any potential hazards 52 are present in the vehicle surroundings (as an example, at the front side of the vehicle) (step S102), and in a case in which no potential hazards 52 are present (step S102: NO), repeats the processing of step S102.

In a case in which a potential hazard 52 is present at the front side of the vehicle (step S102: YES), the CPU 38 identifies the position of the potential hazard 52 with respect to the vehicle 14 and the type of potential hazard 52 (for example a pedestrian, another vehicle, or the like) (step S104). The CPU 38 then determines the gaze directions of the driver and the passenger (step S108). As an example, in a case in which the gazes of the driver and the passenger are directed so as to observe the front side of the vehicle through the windshield 20 (step S108: YES), a masking image 64 is not output (step S110). In such cases, the windshield 20 is in a transparent state, thus allowing the driver and the passenger to see the potential hazard 52 (see FIG. 1).

In a case in which the gazes of the driver and the passenger are not directed so as to observe the front side of the vehicle through the windshield 20 (step S108: NO), the CPU 38 displays a masking image 64 overlaid the potential hazard 52 in the gaze directions of the driver and the passenger (step S112, see FIG. 2).

The CPU 38 determines whether or not self-driving of the vehicle 14 is ongoing (step S114). In a case in which self-driving of the vehicle 14 is ongoing (step S114: YES), the processing is repeated from step S102. In a case in which self-driving of the vehicle 14 has ended (step S114: NO), the CPU 38 ends the processing based on the display control program.

Operation and Advantageous Effects of First Exemplary Embodiment

Explanation follows regarding operation and advantageous effects of the first exemplary embodiment.

As illustrated in FIG. 3, in the present exemplary embodiment, the vehicle information provision device 10 includes the driving monitoring section 30, the surroundings detection sensors 28, the driver monitoring camera 24, and the information control device 32. The information control device 32 detects potential hazards 52 based on the situation in the surroundings of the vehicle 14 as detected by the surroundings detection sensors 28. The information control device 32 also determines whether or not the driver is observing the situation in the surroundings of the vehicle 14, based on the state of the driver during self-driving of the vehicle 14 as detected by the driver monitoring camera 24. When the driving monitoring section 30 has detected that the vehicle 14 is being self-driven, as illustrated in FIG. 1, the information control device 32 provides information regarding potential hazards 52 to the driver in a case in which the driver is observing the situation in the surroundings of the vehicle 14. In contrast thereto, as illustrated in FIG. 2, the information control device 32 restricts provision of information regarding potential hazards 52 to the driver in a case in which the driver is not observing the situation in the surroundings of the vehicle 14. Thus, potential hazards 52 are less likely to enter the field of vision of the driver when the driver, freed up from driving during self-driving of the vehicle 14, is not observing the situation in the surroundings of the vehicle 14, thereby enabling distraction caused by the potential hazards 52 to be suppressed. This enables the comfort of the driver during self-driving to be improved.

Moreover, since the information control device 32 displays the masking images 64 to mask potential hazards 52 in a case in which the driver is not observing the situation in the surroundings of the vehicle 14 during self-driving of the vehicle 14, the driver is able to ascertain circumstances other than the potential hazards 52. Namely, the driver is able to observe the scenery. The driver is also able to ascertain the brightness and so on outside the vehicle, enabling the driver to ascertain the approximate time of day.

The information control device 32 also determines whether or not the passenger is observing the situation in the surroundings of the vehicle 14 based on the detection result of the driver monitoring camera 24 that detects the state of the passenger. The information control device 32 restricts provision of information regarding potential hazards 52 to the passenger in a case in which the passenger is determined not to be observing the situation in the surroundings of the vehicle 14 based on the results of the driver monitoring camera 24 during self-driving of the vehicle 14. Thus, not only the driver, but also the passenger, can be suppressed from being distracted by potential hazards 52 during self-driving of the vehicle 14. This enables the comfort of a passenger other than the driver to be improved during self-driving.

Note that although the exemplary embodiment described above is configured such that the masking images 64 are filled in using colors approximated to the scenery in the surroundings of the potential hazards 52, there is no limitation thereto. The tint of the masking images 64, namely the density of the masking images 64, may be modified according to at least a travel state of the vehicle. As an example, in a case in which the travel state likely changes due to a potential hazard 52 that might affect the behavior of the vehicle 14 being present in the surroundings of the vehicle 14, the density of the masking image 64 may be decreased such that the driver is able to ascertain the potential hazard, thereby enabling the driver to appreciate the reason for the change in behavior in a case in which the vehicle 14 has changed its behavior, and enabling the driver to feel reassured. As another example, in a case in which the vehicle 14 is deemed to be traveling on a regularly traveled route such as a commute based on information from the GPS receiver 46 and the like, the information control device 32 may increase the density of the masking images 64 until potential hazards 52 are barely visible. This enables the driver and the passenger to relax in the vehicle without being distracted by potential hazards 52 when taking a familiar route. These examples enable the comfort of the driver to be further improved during self-driving.

Second Exemplary Embodiment

Figure 7:
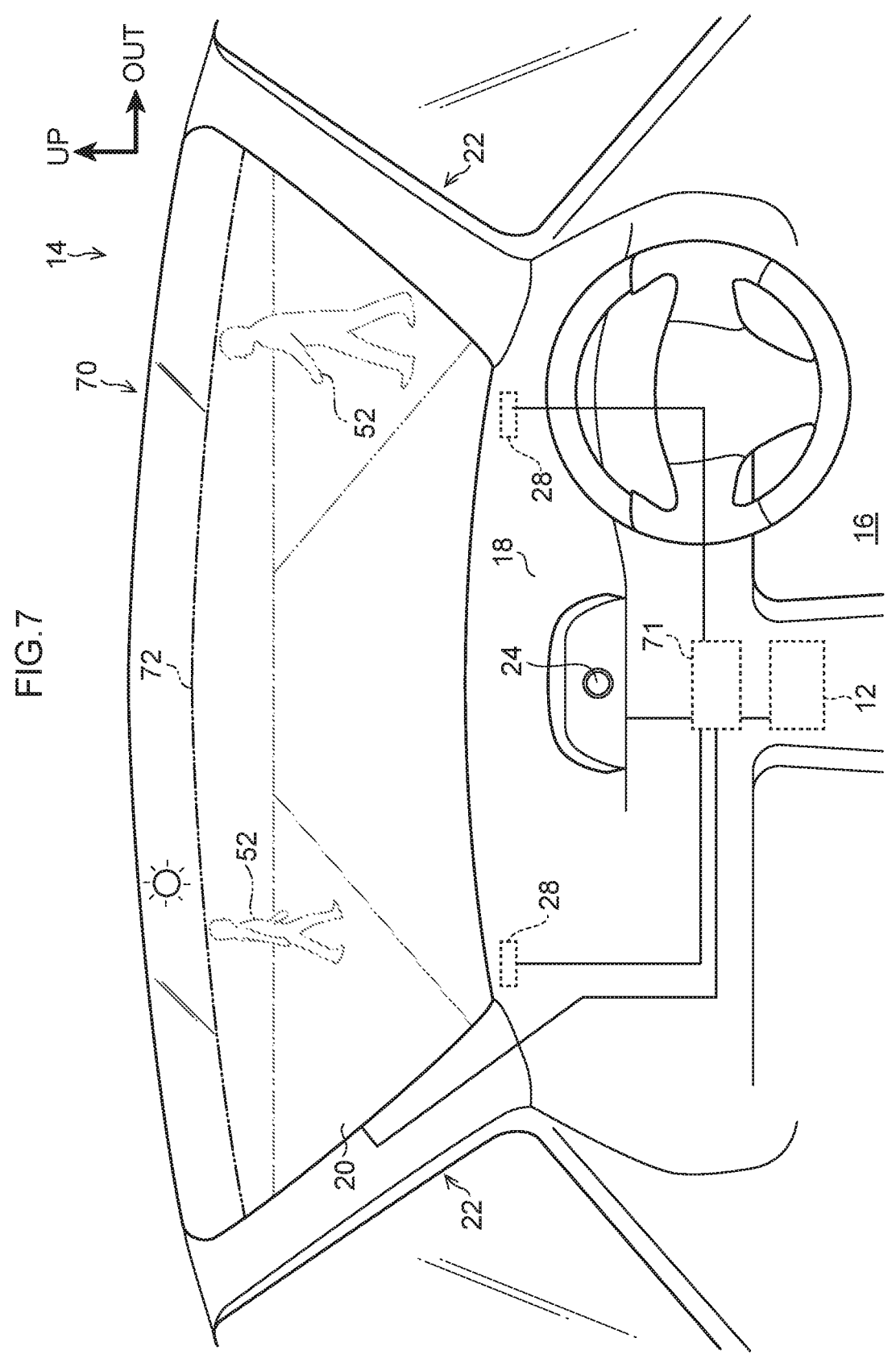
Figure 8:
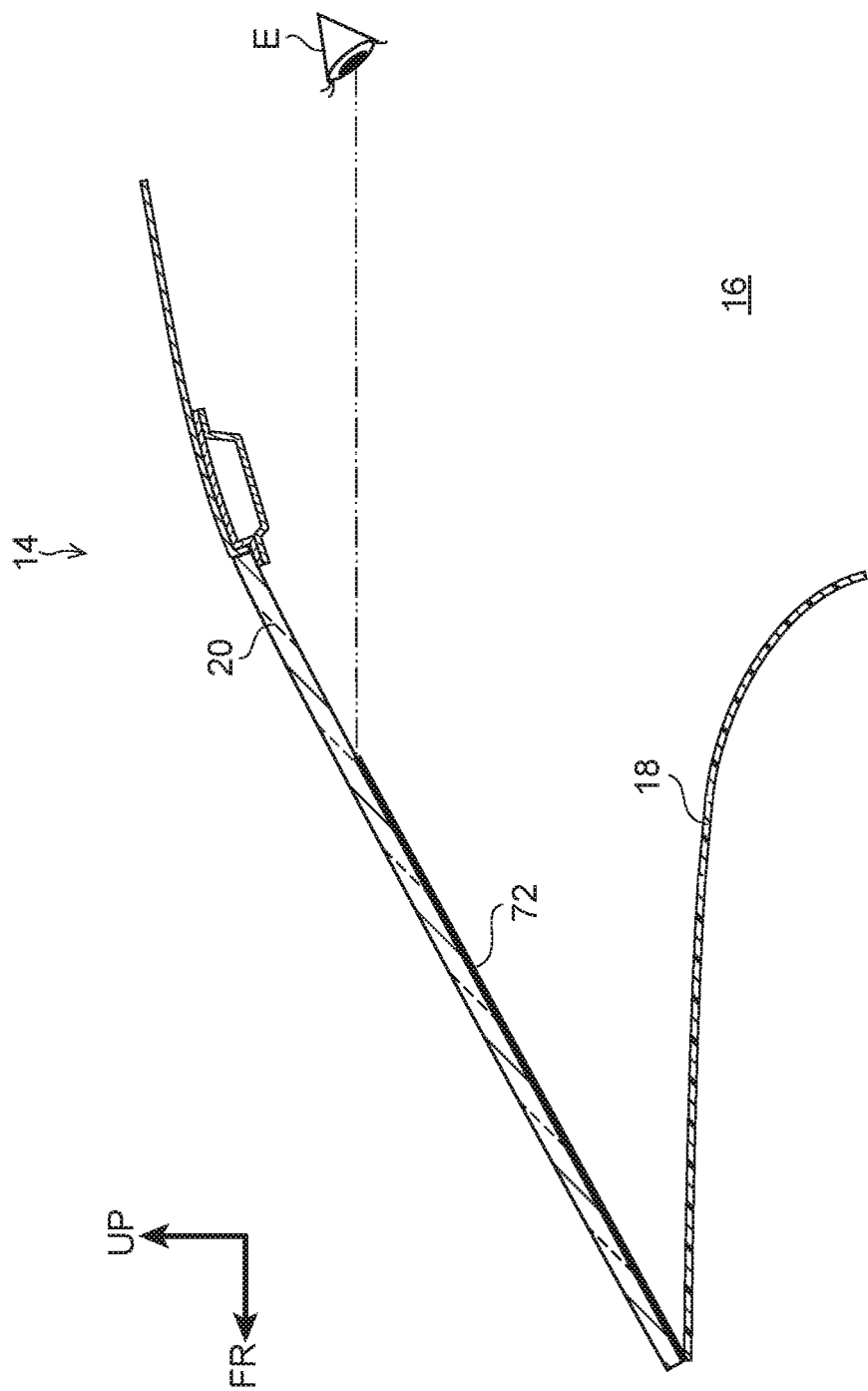
FIG. 8 is a schematic cross-section illustrating an activated state of a vehicle information provision device according to the second exemplary embodiment.

Explanation follows regarding a vehicle information provision device according to a second exemplary embodiment of the present disclosure, with reference to FIG. 7 and FIG. 8. Note that configuration portions that are the same as those in the first exemplary embodiment and so on described above are appended with the same reference numerals, and explanation thereof is omitted.

A vehicle information provision device 70 according the second exemplary embodiment has basically the same configuration as that of the first exemplary embodiment, but includes the feature that, during restricted display is displayed, a masking image 72 is displayed over the entire range of the windshield 20 that is at the vehicle lower side with respect to the eye height of the driver.

Namely, as illustrated in FIG. 7, during restricted display decided by the determination section 60, an output section 74 (see FIG. 5) of the information control device 71 displays the masking image 72 over the entire range of the windshield 20 corresponding to the eye height of the driver. As illustrated in FIG. 8 as an example, the masking image 72 is displayed over the entire range, which is at the vehicle lower side with respect to an eye E of the driver, of the windshield 20. The masking image 72 is filled using colors approximated to the scenery at the front side of the vehicle. Namely, scenery (as an example, the sky) can be observed at a vehicle upper side between an upper edge of the windshield 20 and the masking image 72. Note that in FIG. 8, the eye E of the driver is illustrated in a state when freed up from driving, for example when reading, and is not observing the situation in the surroundings of the vehicle 14.

Operation and Advantageous Effects of Second Exemplary Embodiment

Explanation follows regarding operation and advantageous effects of the second exemplary embodiment.

With the exception of the fact that the masking image 72 is displayed over the entire range of the windshield 20 at the vehicle lower side with respect to the eye height of the driver during restricted display, the configuration described above is similar to that of the vehicle information provision device 10 of the first exemplary embodiment. The configuration obtains similar advantageous effects to the first exemplary embodiment. Moreover, as illustrated in FIG. 7, the information control device 71 displays the masking image 72 so as to mask the entire range at the vehicle lower side with respect to the eye height of the driver in a case in which the driver is not observing the situation in the surroundings of the vehicle 14 during self-driving of the vehicle 14. Thus, in a case in which observation of the scenery is not required, such as when traveling through a location that is passed regularly, the driver is allowed to relax and spend their time freely inside the vehicle as if they were at home, without being distracted by the situation in the surroundings of the vehicle 14. Moreover, display is not masked outside of the range at the vehicle lower side with respect to the eye height of the driver, enabling the driver to ascertain the approximate time of day, weather, and so on based on factors such as the brightness outside the vehicle. This enables the comfort of the driver during self-driving to be further improved.

Note that although the masking image 72 is configured as an image filled in with colors approximated to the scenery at the front side of the vehicle, there is no limitation thereto. For example, the masking image 72 may be an image of the same location captured in advance in a state in which no potential hazards 52 are present.

Third Exemplary Embodiment

Figure 9:
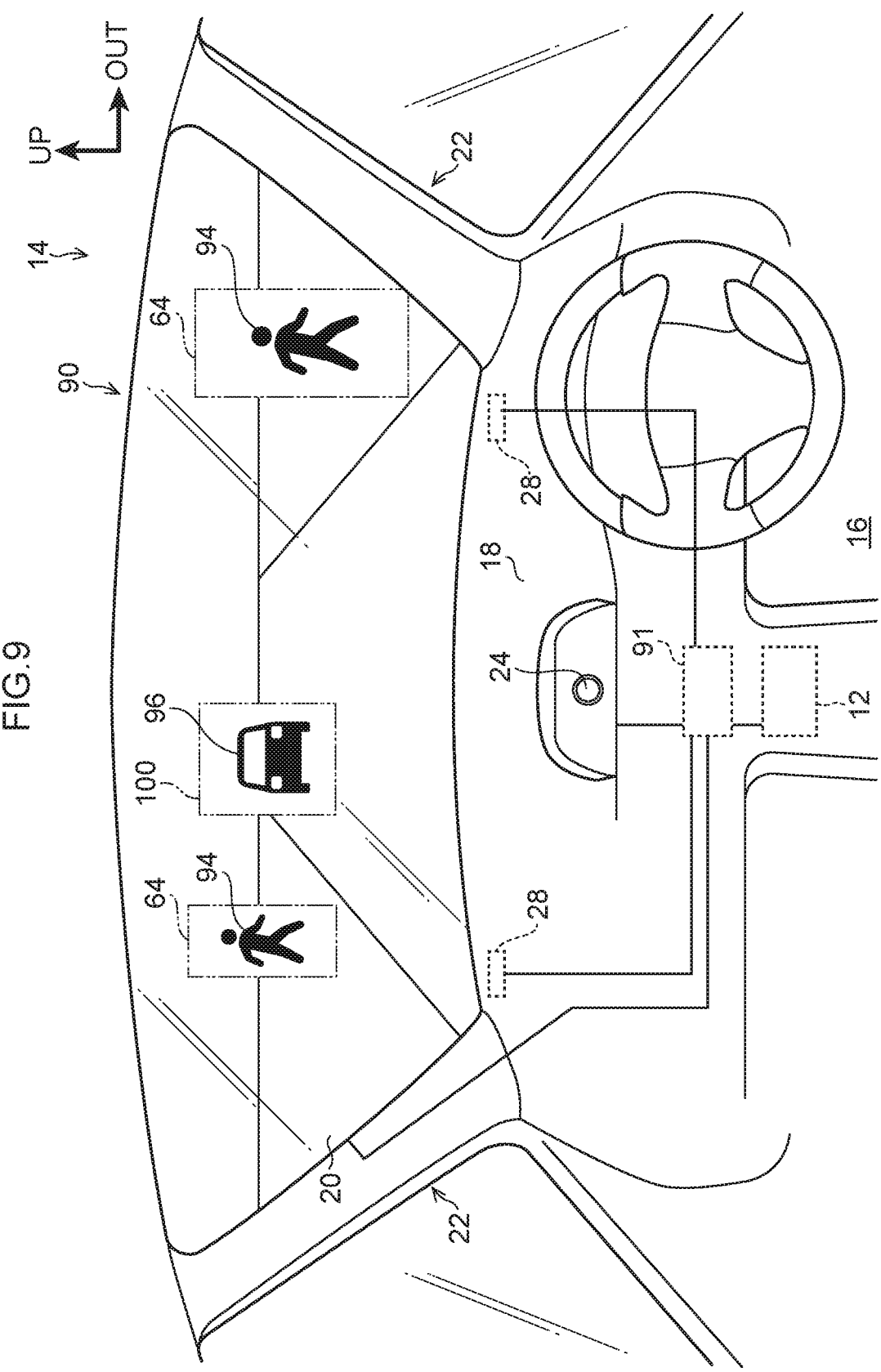
FIG. 9 is a schematic view illustrating an example of a state in which a vehicle information provision device according to a third exemplary embodiment is restricting provision of information regarding potential hazards.
Figure 10:
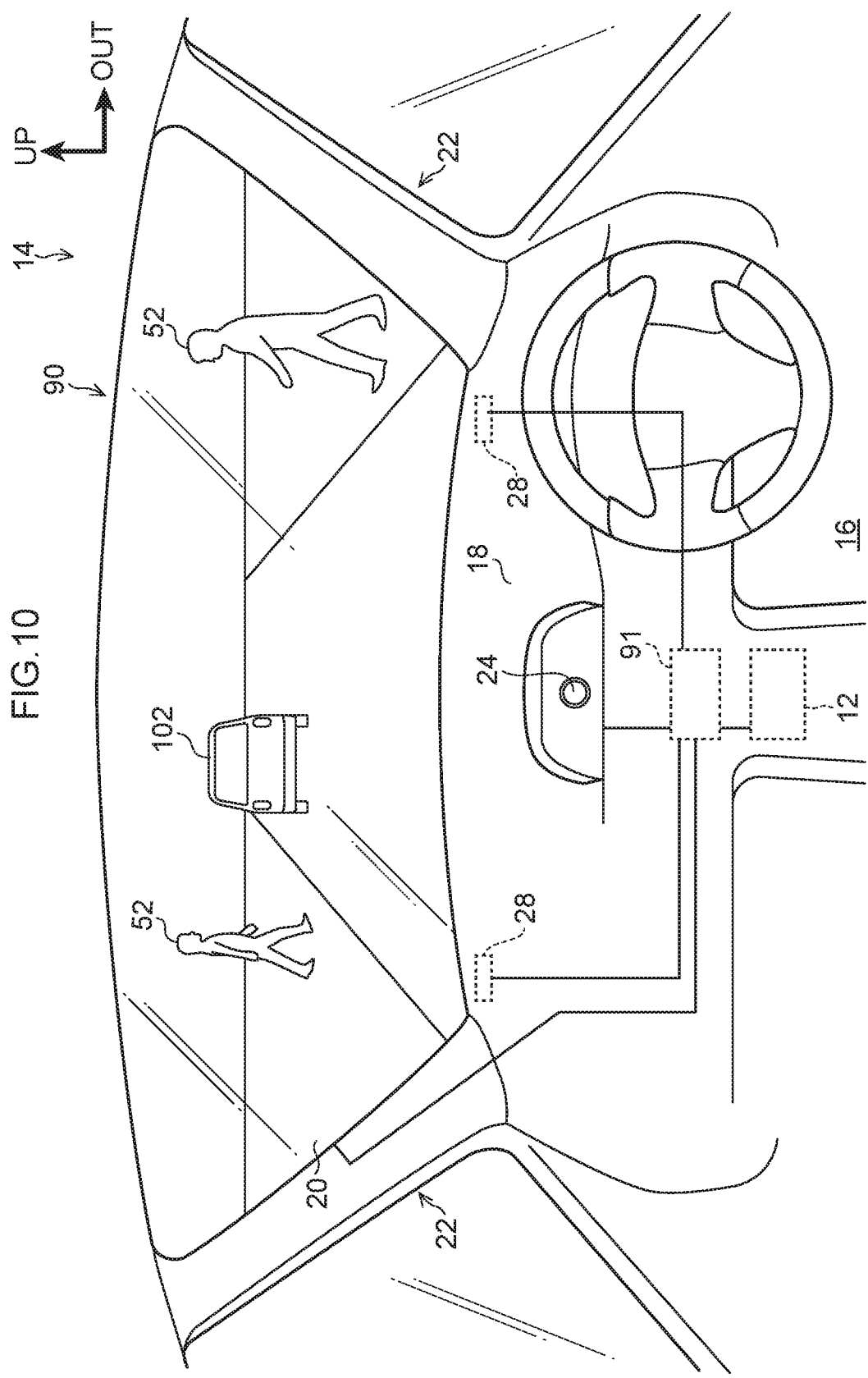
FIG. 10 is a schematic view corresponding to FIG. 9, illustrating a state in which a vehicle information provision device according to the third exemplary embodiment is providing information regarding potential hazards

Explanation follows regarding a vehicle information provision device according to a third exemplary embodiment of the present disclosure, with reference to FIG. 9 and FIG. 10. Note that configuration portions that are the same as those in the first exemplary embodiment and so on described above are appended with the same reference numerals, and explanation thereof is omitted.

A vehicle information provision device 90 according the third exemplary embodiment has basically the same configuration as that of the first exemplary embodiment, but includes the feature that an information control device 91, serving as an information control unit, displays icons 94, 96, serving as simplified information, during restricted display.

Functional Configuration

Namely, during restricted display decided by the determination section 60, as illustrated in FIG. 9, an output section 98 (see FIG. 5) of the information control device 91 displays masking images 64, 100 overlaid on potential hazards 52, 102 (see FIG. 10), and displays the icons 94, 96 corresponding to the potential hazards 52, 102 superimposed on the respective masking images 64, 100. As an example, the masking image 100 covers the entirety of another vehicle, this being a potential hazard 102, and is formed in a rectangular shape filled in with colors approximated to the scenery in the surroundings of the potential hazard 102. Note that although the masking image 100 is illustrated with an outline in FIG. 10 in order to facilitate understanding of the masking image 100, this outline does not have to be present.

As an example, the icon 94 is a simplified depiction of a pedestrian (a symbol in the shape of a person), this being a potential hazard 52, and is displayed on the masking image 64 displayed overlaid on the corresponding potential hazard 52.

As an example, the icon 96 is a simplified depiction of a vehicle (a symbol in the shape of a vehicle), this being a potential hazard 102, and is displayed on the masking image 100 displayed overlaid on the potential hazard 102 (see FIG. 10). Note that although the icons 94, 96 described above are displayed superimposed on the respective masking images 64, 100, there is no limitation thereto, and the icons 94, 96 may be displayed close to the respective masking images 64, 100. Moreover, there is no limitation to the icons 94, 96 described above, and although not illustrated in the drawings, icons representing other vehicle types, such as a bicycle, or another type of obstacle, may be displayed in accordance with to the type of potential hazard.

Operation and Advantageous Effects of Third Exemplary Embodiment

Explanation follows regarding operation and advantageous effects of the third exemplary embodiment.

With the exception of the fact that the icons 94, 96 serving as simplified information are displayed during restricted display, the configuration described above is similar to that of the vehicle information provision device 10 of the first exemplary embodiment. The configuration obtains similar advantageous effects to the first exemplary embodiment. Moreover, in a case in which the driver is not observing the situation in the surroundings of the vehicle 14 during self-driving of the vehicle 14, the information control device 91 displays the icons 94, 96 corresponding to information regarding the potential hazards 52, 102 superimposed on the masking images 64, 100, thereby enabling the driver to ascertain that the potential hazards 52, 102 are present in the surroundings of the vehicle 14, without being overly distracted by the potential hazards 52, 102. This enables the comfort of the driver during self-driving to be still further improved.

Note that although the icons 94, 96 are displayed as the simplified information in the exemplary embodiment described above, there is no limitation thereto, and dots or another form of depiction may be displayed.

Moreover, although determination is made as to whether or not both the driver and the passenger are observing the situation in the vehicle surroundings in the first to third exemplary embodiments, there is no limitation thereto. Determination may be made only as to whether or not the driver is observing the situation in the vehicle surroundings, with masking images 64, 72 being output on this basis.

Furthermore, although the display device is configured such that the see-through display unit is provided over the entire surface of the windshield 20 and the masking images 64, 72 are displayed on the windshield 20, there is no limitation thereto. The masking images 64, 72 may be projected onto the windshield 20 using a non-illustrated head-up display device, or another configuration may be applied.

Furthermore, although the masking images 64, 72 are displayed on the windshield 20, there is no limitation thereto. The masking images 64, 72 may be displayed on a side window or other window glass according to the direction being observed by the driver or the passenger.

Moreover, although the output sections 62, 74, 98 are configured so as to output the masking images 64, 72, there is no limitation thereto. The output sections 62, 74, 98 may be configured so as to control the provision of information to the driver and the passenger using audio or the like.

Although exemplary embodiments of the present disclosure have been explained above, the present disclosure is not limited to the above description, and obviously various other modifications may be implemented within a range not departing from the scope of the present disclosure.

What is claimed is:

1. A vehicle information provision device comprising a processor configured to:
    detect a travel state of a vehicle, the vehicle being capable of self-driving;
    detect a situation in surroundings of the vehicle;
    detect a potential hazard based on the situation in the vehicle surroundings;
    detect a state of a driver during self-driving of the vehicle;
    determine whether or not the driver is observing the situation in the vehicle surroundings based on the state of the driver; and
    when self-driving of the vehicle is detected, provide information to the driver regarding the potential hazard in a case in which the driver is observing the situation in the vehicle surroundings, and restrict provision of information to the driver regarding the potential hazard in a case in which the driver is not observing the situation in the vehicle surroundings during self-driving of the vehicle.

2. The vehicle information provision device of claim 1, wherein the processor is configured to:
    display a masking image that masks the potential hazard on a display device, in a case in which the driver is not observing the situation in the vehicle surroundings during self-driving of the vehicle.

3. The vehicle information provision device of claim 2, wherein the processor is configured to:
    display simplified information corresponding to the potential hazard either superimposed on or close to the masking image, in a case in which the driver is not observing the situation in the vehicle surroundings during self-driving of the vehicle.

4. The vehicle information provision device of claim 1, wherein the processor is configured to:
    display a masking image that masks an entire range at a vehicle lower side with respect to an eye height of the driver on a display device, in a case in which the driver is not observing the situation in the vehicle surroundings during self-driving of the vehicle.

5. The vehicle information provision device of claim 4, wherein the processor is configured to:
    display simplified information corresponding to the potential hazard either superimposed on or close to the masking image, in a case in which the driver is not observing the situation in the vehicle surroundings during self-driving of the vehicle.

6. The vehicle information provision device of claim 1, wherein the processor is configured to:
   detect a state of a passenger other than the driver;
   determine whether or not the passenger is observing the situation in the vehicle surroundings based on the state of the passenger; and
   restrict provision of information to the passenger regarding the potential hazard, in a case in which the passenger is not observing the situation in the vehicle surroundings during self-driving of the vehicle.

7. The vehicle information provision device of claim 2, wherein the processor is configured to: modify a tint of the masking image according to the travel state detected by the travel state detection unit.

8. A vehicle information provision device comprising a processor configured to:
   detect a potential hazard based on a situation in surroundings of the vehicle;
   detect a state of a driver; and
   restrict provision of information to the driver regarding the potential hazard based on the state of the driver during self-driving of the vehicle.

* * * * *